W. D. Lindsley,

Cage Trap.

No. 104,172.  Patented June 14, 1870.

Witnesses:
S. S. Mabee
Alex. F. Roberts

Inventor:
W. D. Lindsley
per
Attorneys.

United States Patent Office.

WILLIAM D. LINDSLEY, OF EUDORA, KANSAS.

Letters Patent No. 104,172, dated June 14, 1870.

IMPROVED ANIMAL-TRAP.

The Schedule referred to in these Letters Patent and making part of the same.

To all whom it may concern:

Be it known that I, WILLIAM D. LINDSLEY, of Eudora, in the county of Douglas and State of Kansas, have invented a new and useful Improvement in Animal-Traps; and I do hereby declare that the following is a full, clear, and exact description thereof, which will enable others skilled in the art to make and use the same, reference being had to the accompanying drawing forming part of this specification.

This invention relates to a new and useful improvement in traps for catching rats and mice and other animals; and consists in the combination and arrangement of parts as hereinafter specified.

In the accompanying drawing—

Similar letters of reference indicate corresponding parts.

Figure 1:
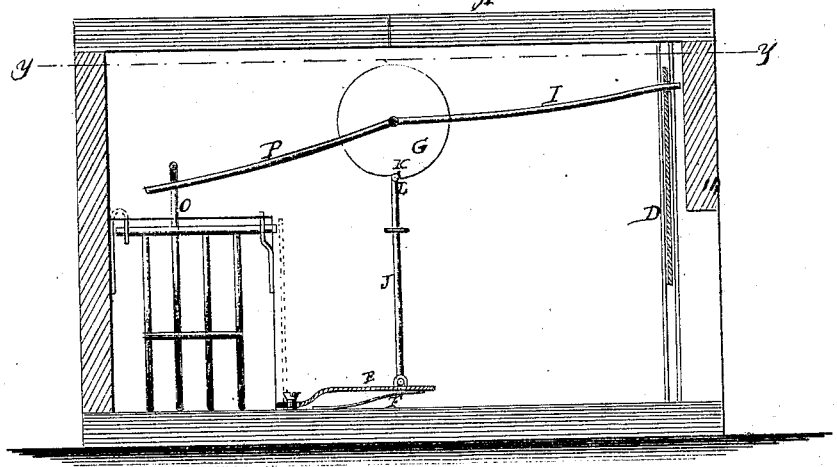
Figure 1 is a vertical section of the trap, on the line x x of fig. 2.
Figure 2:
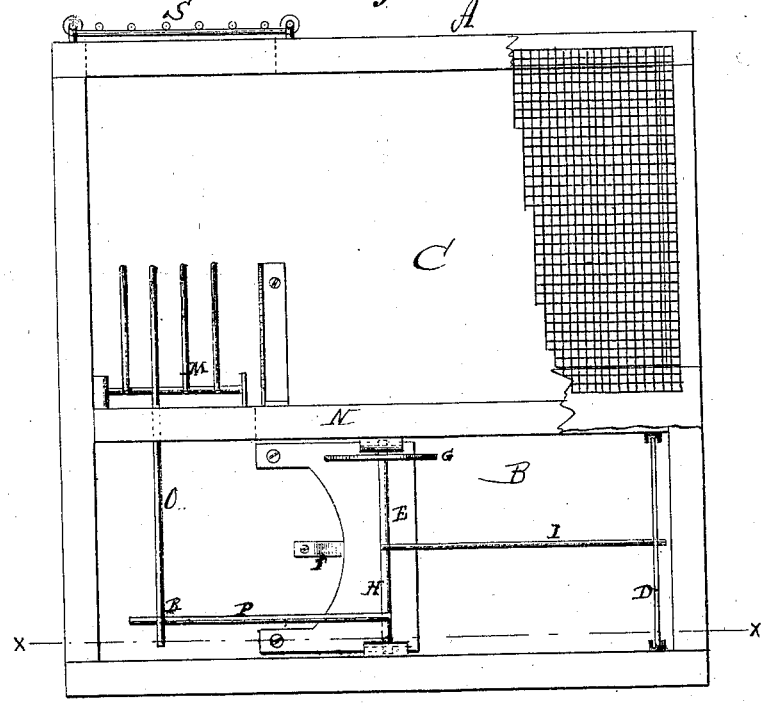
Figure 2 is a horizontal section of fig. 1, on the line y y.

A is a square or rectangular-shaped box, of any desired size or dimensions, made of either wood or metal, or both combined, divided-into two compartments.

B is the entrance-door for the animal.

E is the pan upon which the bait is placed, or upon which the animal treads to spring the trap.

Beneath the pan is a small spring, F, which keeps the fan slightly raised from the floor or the bottom of the trap.

G is a light wheel on one end of the shaft or rod H, near the top of the trap.

I is a rod, rigidly attached to the rod H, which extends horizontally forward to and is connected with the drop-door D.

J is an upright wire or rod, which is attached to the fan, as seen at K.

Its upper end is turned at a right angle, and engages with a notch in the wheel G, as seen at L.

When the pan E is depressed, the rod J is detached from the notch and the trap springs, and the door D, being held up by the rod I, falls by its own gravity and secures the animal.

M is an inclined drop, pivoted to the partition N, and extending into the compartment C, with the end resting on the floor.

O is a rod or wire, rigidly attached to this drop, and

P is another rod or wire, attached to the shaft H of the wheel G.

The rod O rests upon P, as seen at R, where the two cross-each other.

The rat or other animal having sprung the trap and shut himself into the compartment B, discovers light in the compartment C, and rushes under the drop M into C. In doing this he raises the end of the drop M, which depresses the ends of the rods O and P. This partially revolves or turns the wheel G, so that the wire J engages again with the notch, as seen at K, and resets the trap, the effect of revolving the wheel being to raise the drop-door D by means of the rod I.

The top of the compartment C may be made of wire-cloth, or be grated, so as to make light.

S is a door, from which the animal is taken.

Having thus described my invention,

I claim as new and desire to secure by Letters Patent—

The animal-trap formed by the combination of the compartments B and C, drop-doors D and M, pan E, wheel G, trip-rods J, and rods H, I, P, and O, arranged substantially as shown and described.

WM. D. LINDSLEY.

Witnesses:
WM. H. COLE,
L. M. DEY.